July 12, 1938.   O. T. HANDWERK   2,123,725
IMPEDANCE CONTROLLING APPARATUS
Filed April 23, 1936   3 Sheets-Sheet 1

Inventor
Otto T Handwerk
by McConkey & Booth
Attorneys

July 12, 1938.   O. T. HANDWERK   2,123,725
IMPEDANCE CONTROLLING APPARATUS
Filed April 23, 1936   3 Sheets-Sheet 2

Inventor
Otto T. Handwerk
by McConkey & Booth
Attorneys

July 12, 1938.  O. T. HANDWERK  2,123,725
IMPEDANCE CONTROLLING APPARATUS
Filed April 23, 1936  3 Sheets-Sheet 3

Inventor
Otto T. Handwerk
by McConkey & Booth
Attorneys

Patented July 12, 1938

2,123,725

UNITED STATES PATENT OFFICE 2,123,725

IMPEDANCE CONTROLLING APPARATUS

Otto T. Handwerk, Chicago, Ill., assignor to Republic Flow Meters Company, Chicago, Ill., a corporation of Illinois Application April 23, 1936, Serial No. 76,013

9 Claims. (Cl. 73—193)

This invention relates to measuring apparatus, and is illustrated as embodied in an apparatus for integrating a flow measurement with a differential temperature measurement to find the quantity of heat absorbed or given up by the fluid stream being measured, as for example the quantity of heat absorbed by the cooling coil of a refrigerator system.

In one desirable arrangement a flow-controlled resistance or other reactance, such as a standard electrically-registering flow-meter, is arranged in an indicator circuit in series with a variable impedance (as for example a variable-step transformer) controlled in accordance with the differential temperature measurement. However, many of the features and advantageous arrangements described below are applicable to circuits controlled by other conditions than flow and temperature.

An important feature of the invention relates to increasing the sensitivity and accuracy of the apparatus, by arranging the variable impedance for operation by power derived from a reversible electric motor controlled in accordance with the particular condition which it is desired should vary the setting of the impedance. Preferably the motor runs continuously, in one direction or the other, and the setting of the impedance is determined by constantly reversing the motor about the desired setting as a neutral point. If desired, the motor may drive the impedance through a lost-motion connection, so that the setting is only actually changed by the motor when the value of the controlling condition changes.

The mechanism for controlling the reversal of the motor, under the control of the measured condition, in itself embodies substantial novelty. In the illustrated embodiment of the invention, the controlling measurement is utilized to set a variably-positioned stop, as for example a vertical link having a control slot in its end, which cooperates with a device which is shifted constantly back and forth by the motor, automatically to open and close contacts in a control circuit, which operates (by a solenoid or the like) a reversing switch which in turn controls the operation of the motor.

The above and other objects and features of the invention, including various novel combinations of parts and desirable particular constructions, will be apparent from the following description of the illustrative embodiment shown in the accompanying drawings, in which.

Figure 6:
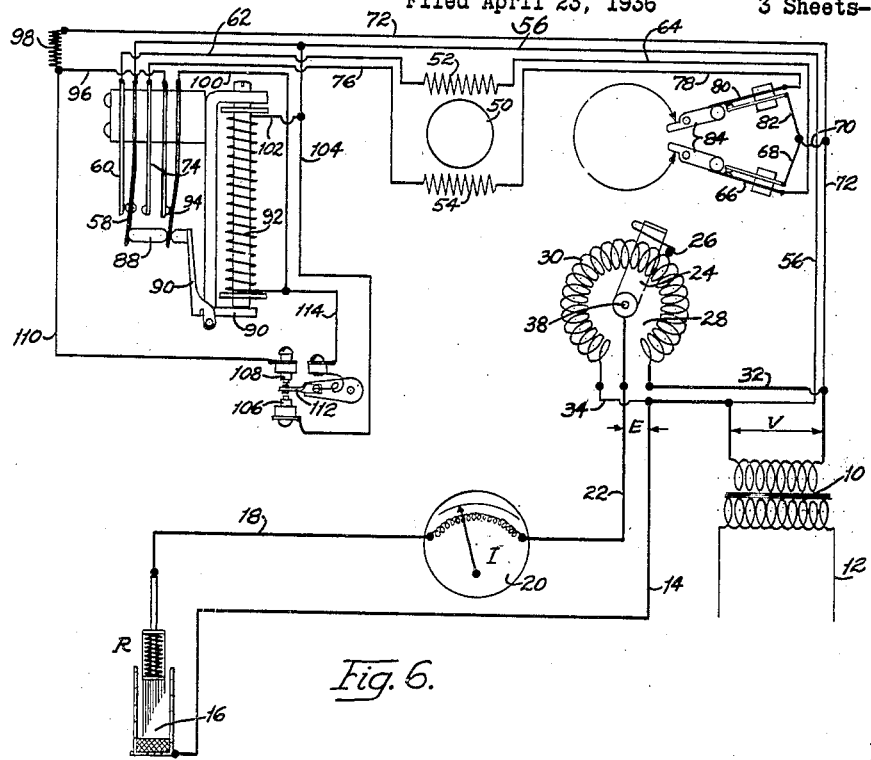
Figure 6 is a wiring diagram showing the apparatus of Figure 1 in an indicator circuit which also includes a standard electric flow-meter.

The apparatus illustrated is intended, as one of its uses, for connection in a circuit such as that illustrated in Figure 6. This particular circuit includes a source of electric power such as a transformer 10 the primary of which is connected into the usual lighting circuit 12, and the secondary of which is connected by a line 14 to one terminal of a standard electric flow-meter 16 arranged, for example, to measure the flow of brine or the like through a refrigerating system. This flow-meter may, if desired, be constructed substantially as described in Patents Nos. 1,390,394 and 1,601,743, granted September 13, 1921, and October 5, 1926, respectively.

As such flow-meters are well known commercially, it is not necessary to describe them in detail, or further than to note that they produce a resistance to the flow of an electric current which is proportional to the flow being measured. Such a flow meter may therefore be regarded broadly as a representative form of flow-controlled impedance.

The other side of the flow-meter 16 is shown connected by a line 18 to a suitable electrical indicating device 20 which may, if desired, be of the type fully described in application No. 714,059, filed March 5, 1934, by Albert F. Spitzglass.

The indicator is connected by a line 22 to an adjustable arm 24 carrying the wiper 26 of a variable impedance such as a standard variable step auto-transformer 28. The wiper 26 movably engages the coil 30 of the transformer, which coil has its primary terminals connected through lines 32 and 34 to the secondary terminals of the transformer 10.

Assuming that the arm 24 is set automatically to correspond to the difference in temperature between two points in a fluid stream whose flow is measured by the meter 16, as for example the intake and outlet ends of a refrigerator coil, it will be seen that the temperature differential is integrated with the flow measurement to give a product indicated on the indicating instrument. This product will be in proportion to the heat absorbed (or given up) between the two points at which the temperature measurements are made, and the instrument 20 can therefore be calibrated to read directly (for example) in British thermal units.

Figure 7:
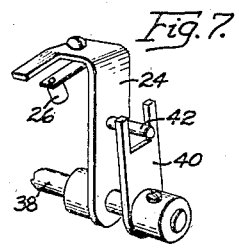
Figure 7 is a perspective view of a lost-motion mechanism which may be used to connect the motor and the variable impedance.

The variable step auto-transformer 28 has its arm 24 mounted, as shown in Figure 7, loosely on a central shaft 38, on which is fixed a second arm 40 having at its end a relatively wide notch embracing a drive pin 42 on the arm 24. This provides a lost-motion connection between the shaft 38 and the arm 24 such that the shaft 38 may oscillate constantly back and forth, without affecting the position of the arm 24 except when the range of oscillation of the shaft 38 changes.

The shaft 38 carries a relatively large gear 44, shown as driven by an intermediate gear 46 from a pinion 48 driven by a reversible motor 50. The motor 50 has two fields 52 and 54, and is continuously driven in one direction or the other according to which of the fields is energized. A lead 56 from one side of the transformer secondary connects with a leaf spring 58 carrying contacts on both sides, and forming the movable element of a reversing switch which controls the motor.

Figure 1:
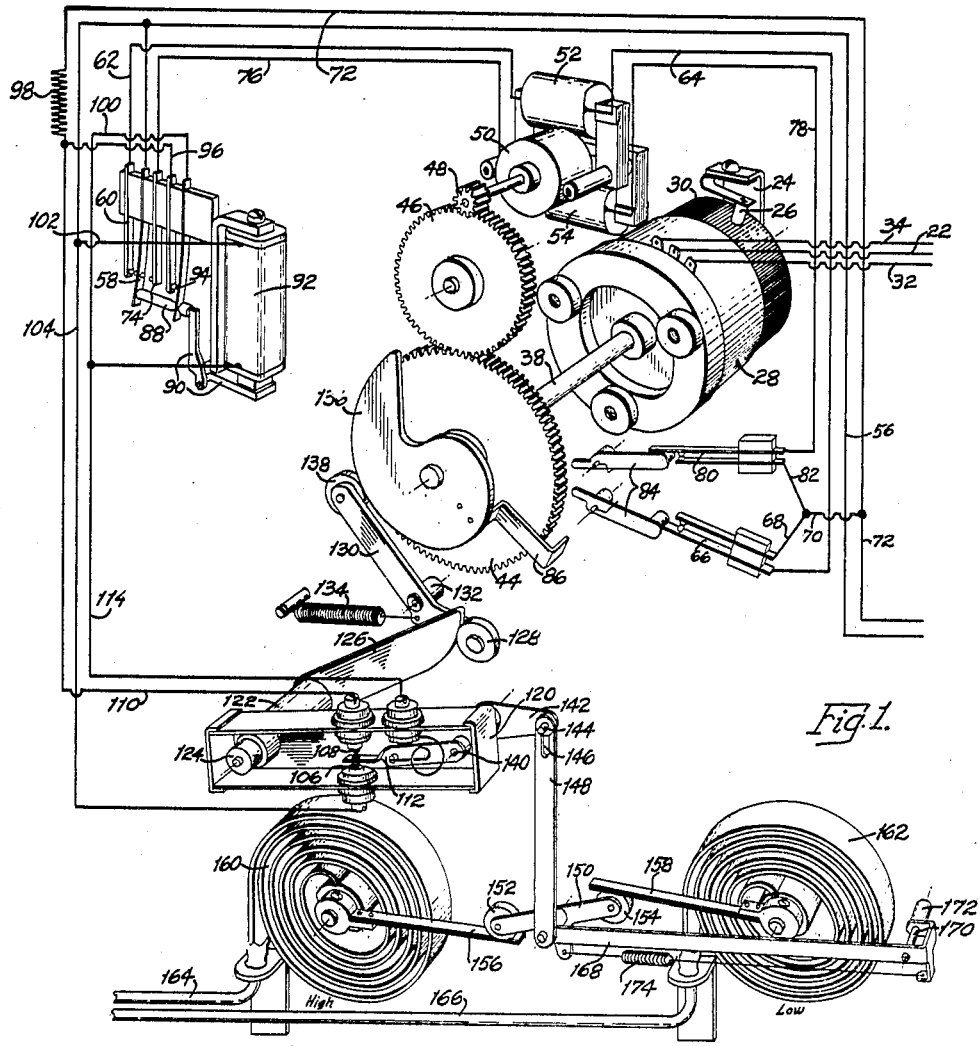
Figure 1 is a diagrammatic perspective of the variable impedance and the means for controlling it according to a differential pressure measurement.
Figures 2, 3:
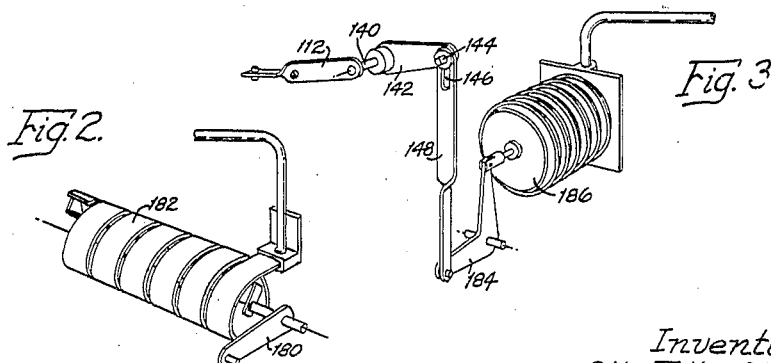
Figures 2 and 3 are perspective views of devices capable of use for controlling the variable impedance according to other conditions than differential temperature.

When the leaf spring contact 58 is swung to the left, as shown in Figures 1 and 6, it engages a second leaf spring 60 connected through a lead 62 with the field 52 of the motor 50. The other side of the field 52 is connected through a lead 64 with one contact of a limit or safety switch 66 which in turn is connected through leads 68 and 70 with a line 72 connected to the other side of the secondary of the transformer 10. It will be noted that the above-described circuit (as well as the one through field 54 described below) is in parallel with the circuit through the flowmeter 16 and the indicator 20.

When the leaf-spring contact 58 is swung to the right, it engages a third spring contact 74 connected by a lead 76 to the field 54. The field 54 at its opposite end is connected by a lead 78 to a second limit or safety switch 80, which is connected by a lead 82 and the above-mentioned lead 70 to the line 72.

The safety switches 66 and 80 are provided with operating levers 84, one or the other of which is engaged and operated by an arm 86 when and if the arm 24 (and therefore the gear 44) passes beyond its desired range of movement. For convenience the arm 86 is shown mounted on the gear 44, the limit switches 66 and 80 being adjustably mounted wherever desired about the periphery of the gear 44.

The spring contact 58 is swung back and forth, to drive the motor 50 in one direction or the other, by a connection 88 from a bellcrank 90 operated by a solenoid 92. Energization of the solenoid 92 lifts its core, the bellcrank lever 90 being weighted or spring-pressed in any desired manner to follow the upward movement of the core and close the contacts 58—60. Deenergization of the solenoid 92 allows the core to drop, rocking the bellcrank lever 90 in a direction to close the contacts 58—74.

The bellcrank lever connection 88 also acts to open and close contacts 94 forming a holding switch connected by a lead 96 and a resistance 98 to the line 72, and connected on the other side by a lead 100 to the lower end of the coil of the solenoid 92. The upper end of the coil of the solenoid 92 is connected by a lead 102 to a line 104 leading from the line 56 to one contact 106 forming one of a pair of stationary contacts further described below.

The other contact 108 of the stationary contacts is connected by a lead 110 through the resistance 98 to the line 72. A movably pivoted contact 112, arranged between the two contacts 106 and 108, is connected by a lead 114 to the line 100 and to the lower end of the coil of the solenoid 92.

In operation, the closing of the contacts 108–112, by means described below, closes a circuit from transformer 10, through line 72, resistance 98, line 110, contacts 108–112, lead 114, solenoid 92, lead 102, line 104, line 56, back to the transformer 10. This energizes the solenoid 92, causing lever 90 to swing in a direction to close the holding switch 94 and to close the contacts 58–60, thereby energizing the field 52 of the motor 50.

The closing of the contacts 94 establishes a holding circuit from transformer 10 by way of line 72, through resistance 98, lead 96, holding switch 94, lead 100, solenoid 92, lead 102, line 104, and line 56, back to the transformer 10. Thus even if contacts 108–112 should reopen, the solenoid 92 remains energized and the contacts 58–60 remain closed.

Now if the contact 112 moves away from the contact 108, and engages the contact 106, it short-circuits solenoid 92 through the line 114, contacts 112–106, line 104, and lead 102. This short-circuit de-energizes the solenoid 92, allowing the core to drop, thereby rocking the lever 90 in a direction to open the contacts 94 and 58–60, and to close the contacts 58–74, thereby establishing a circuit through the field 54 and causing the motor 50 to run in the opposite direction. The switch circuits are now all de-energized, and remain so until contact 112–108 is again established.

Thus it will be seen that rocking the contact 112 back and forth causes the motor 50 to run alternately in opposite directions, and causes the shaft 38 to oscillate as previously explained.

The contacts 106 and 108 are mounted on the opposite walls of a boxlike device 120 carried by a sleeve 122 journaled on a stationary supporting shaft 124 and rigid with an operating arm or cam 126. The cam surface of arm 126 is operatively engaged by a roller 128 carried by the lower end of a lever 130 fulcrumed at 132 and rocked, against the resistance of a spring 134, by an edge cam 136 rigidly mounted on the end of the shaft 38 and engaging a cam roller 138 on the lever 130. The cam 136 is oscillated as the motor 50 reverses to rock the lever 130 and is generally spiral to give the lever 130 a substantially uniform movement.

Thus as the shaft 38 oscillates back and forth, it rocks the device 120 up and down, the exact motion being determined by the shape of the cam surface on the arm 126.

As long as the device 120 is moving freely upwardly, the contacts 106–112 remain closed, with the corresponding motor circuit closed. The contact 112 is carried by a shaft 140 rigidly carrying an arm 142 spring-pressed in a direction tending to close the contacts 106–112 and having at its end a pin 144 riding in a slot 146 in the upper end of a vertical link 148.

The lower end of the link 148 is pivoted to the center of an equalizer bar 150 having at its ends rollers 152 and 154 engaged on the bottom and top respectively by arms 156 and 158 operatively connected to two spirally-wound identical flat hollow tubes 160 and 162, of the Bourdon type, which are connected by conduits 164 and 166 to bulbs (not shown) inserted in the fluid stream at the points where the temperature is to be measured. The bulbs and the conduits 164 and 166 and the tubes 160 and 162 are all filled, in the usual manner, with mercury or other operating fluid.

It will be noted that simultaneous rise or fall of temperature at the two points being measured will merely rock the equalizer bar 150 about its center pivot, without affecting the position of the link 148. A differential change in temperature, however, will raise or lower the center of the bar 150, and correspondingly raise or lower the link 148 and its slot 146.

The equalizer bar 150 is guided by a distance arm 168 connected at one end to the pivot connecting the equalizer bar 150 and the link 148, and fulcrumed at its other end on a fixed pivot 170. Arm 168 may if desired be provided with a sleeve 172 or the like, carrying a pointer (not shown) moving over a suitable scale to give a visual indication of the differential temperature measured by the above-described apparatus. A spring 174 may be provided to hold the rollers 152 and 154 against the arms 156 and 158.

Figure 4:
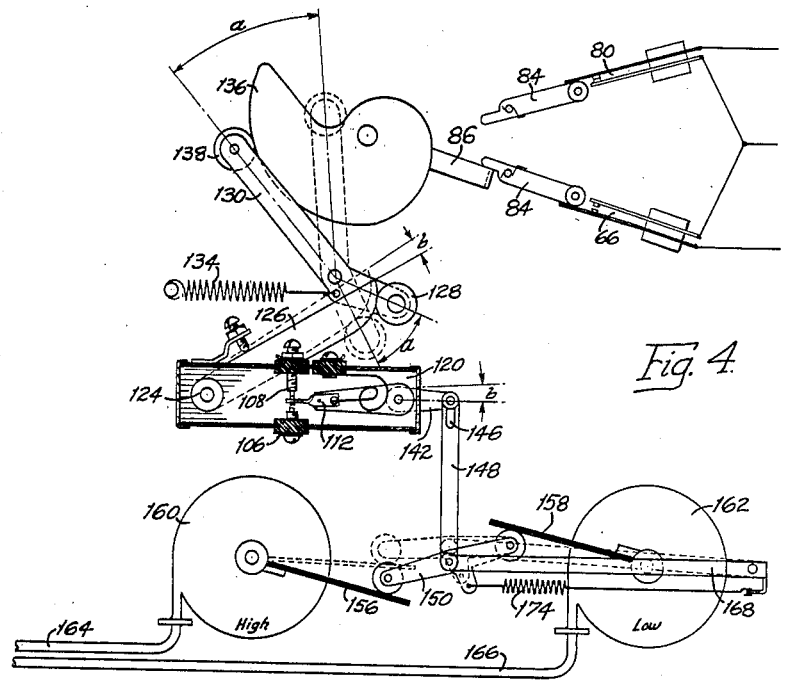
Figures 4 and 5 are diagrams showing the switch-controlling means of the apparatus in different positions.
Figure 5:
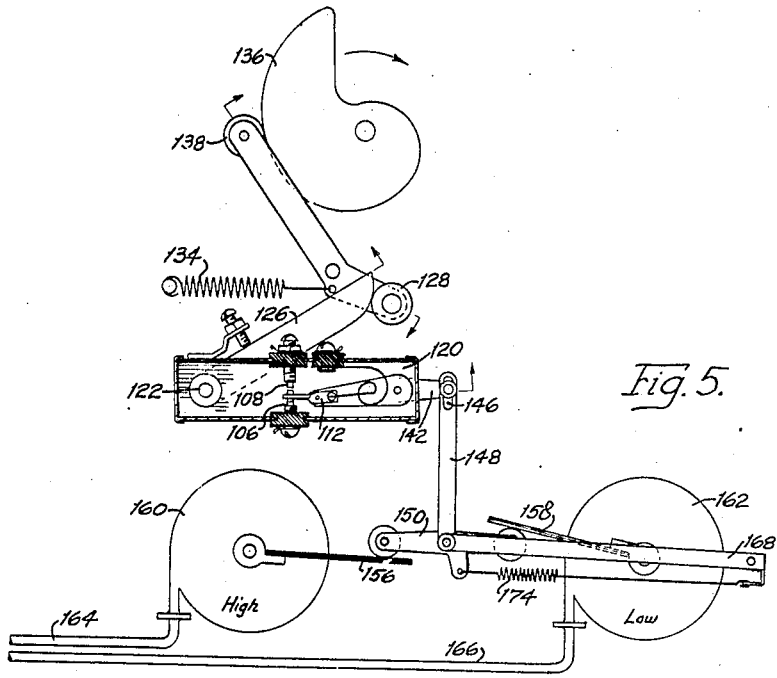

Figures 4 and 5 illustrate the manner in which the above-described mechanism acts to control the movable contact 112. Figure 4 shows in full lines the position of the parts when the device 120 is in its uppermost position, with the arm 142 rocked by engagement of the pin 144 with the top of the slot 146, in such a manner as to close the contacts 108–112. As previously explained, this reverses the motor, and the device 120 begins to swing downward again, breaking the contacts 108–112 apart.

However, because of the holding circuit through the switch 94, the motor continues to run in the same direction until the contacts 106–112 reengage; this breaks the holding circuit and reverses the motor again. Thus the motor runs continuously, for short intervals in opposite directions, to oscillate the shaft 38 about a neutral position determined by the position of the link 148.

If the temperature differential changes in a direction to lift the equalizer bar to the dotted line position in Figure 4, the parts assume the positions shown in Figure 5. Now the motor will run longer than before, until pin 144 again reaches the top of slot 146, thus establishing a new range of oscillation for shaft 38, and setting the wiper 26 accordingly.

Conversely, lowering the equalizer bar 150 will pull down on the arm 142 and keep the contacts 108–112 closed longer than usual, shifting the range of oscillation of shaft 38 in the opposite direction from that described above, and shifting the wiper 26 in the opposite direction to its corresponding new setting.

Figure 8:
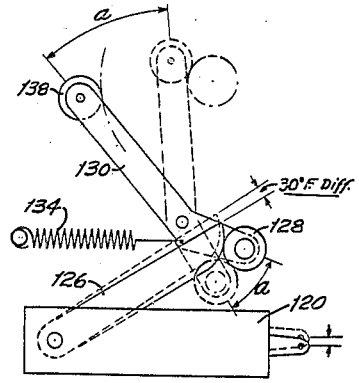
Figures 8, 9, 10, and 11 are diagrams showing the use of different cams according to different ranges of temperature differentials to be measured.
Figures 9, 10, 11:
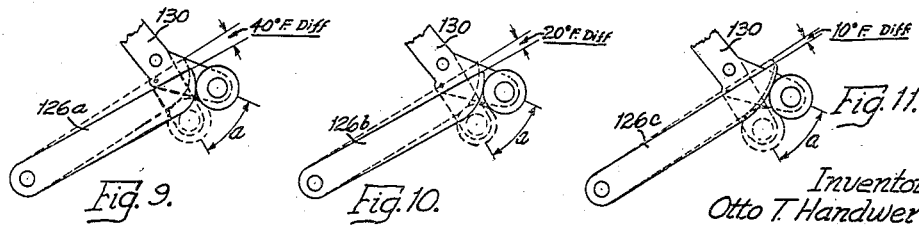

Different shapes of cams, shown at 126ª, 126ᵇ, and 126ᶜ in Figures 9, 10, and 11, may be provided for different temperature ranges. Those illustrated are for ranges of 40° F., 20° F., and 10° F., respectively, and the one in Figure 8 is for a range of 30° F. As shown, these cams are all designed to be used with the same cam 136.

Other devices may be substituted for the tubes 160 and 162 where other control conditions than a differential temperature are to be measured. An arm 180 of a hollow helix 182, described more fully in Spitzglass Patent No. 2,008,970, or a bellcrank 184 actuated by a metal bellows 186, may be directly connected to the link 148 where a single temperature or pressure is the condition being measured.

While the various parts of the circuits, and of the apparatus, have been described in detail, it is not my intention to limit the scope of the invention by that description, or otherwise than by the terms of the appended claims.

I claim:

1. Apparatus of the class described comprising an indicator, a flow-meter, a variable impedance, and a source of electric power, all arranged in series in a circuit, and a second circuit which also includes said source and which is in parallel with the first circuit and which includes a reversible motor arranged to operate the variable impedance and a reversing-switch device controlling the motor and a mechanism which is responsive to a condition to be integrated with the flow measured by the flow-meter and which automatically controls said switch device to set the variable impedance in accordance with said condition.

2. Apparatus of the class described comprising an indicator, a flow-meter, and a variable impedance all arranged in series in a circuit, and a second circuit which includes a reversible motor arranged to operate the variable impedance and a reversing-switch device controlling the motor and a mechanism which is responsive to a condition to be integrated with the flow measured by the flow-meter and which automatically controls said switch device to set the variable impedance in accordance with said condition.

3. Apparatus of the class described including a variable impedance, and means for automatically changing the setting of said impedance comprising a reversible motor connected to operate said impedance, a reversing switch controlling said motor, limit switches controlled by said impedance for stopping said motor when the impedance reaches either of two extreme positions, a device responsive to a condition which it is desired should control said impedance, and means operated by said device for actuating said reversing switch for changing the setting of said impedance in accordance with changes in said condition.

4. Apparatus of the class described including a variable impedance, and means for automatically changing the setting of said impedance comprising a continuously-running reversible motor connected to operate said impedance, a reversing switch controlling said motor, a device responsive to a condition which it is desired should control said impedance and which includes a part whose position is determined by measurements of said condition, and mechanism driven by said motor and constantly approaching and receding from a position determined by the position of said measuring device part for actuating said reversing switch in opposite directions as the mechanism reaches and recedes from said position for changing the setting of said impedance in accordance with changes in said condition.

5. Apparatus of the class described including a variable impedance, and means for automatically changing the setting of said impedance according to a condition and which means comprises a device responsive to said condition, a vertical link whose vertical position is varied by said device according to the measurements of said condition and which has a slot at its end, a reversible motor connected to operate said impedance, a reversing switch controlling said motor, and a control for the reversing switch mounted to be rocked up and down by operation of said motor in opposite directions and which includes a part in said slot and connections therefrom for reversing said switch each time said part reaches or recedes from the end of the slot.

6. Apparatus of the class described including a variable impedance, and means for automatically changing the setting of said impedance according to a condition and which means comprises a device responsive to said condition, a part whose position is varied by said device according to the effects of said condition, a reversible motor connected to operate said impedance, a reversing switch controlling said motor, and a control for the reversing switch mounted to be rocked by operation of said motor in opposite directions and which includes a part engageable with the variably-positioned part and connections therefrom for reversing said switch each time said parts contact or recede from each other.

7. Apparatus of the class described comprising a reversible motor, a reversing switch and a holding switch having a solenoid arranged to actuate them and with the reversing switch connected to control the direction of operation of the motor, and means for controlling the solenoid comprising a device shifted in opposite directions by oppositely-directed operations of the motor, a pair of fixed contacts and a movable contact between them all mounted on said device and so connected that engagement of the movable contact with one of the fixed contacts causes operation of the solenoid to close the reversing switch in one direction and to close the holding switch to keep it so closed while engagement of the movable contact with the other fixed contact causes operation of the solenoid to open the holding switch and close the reversing switch in the opposite direction, variably-positioned means for moving the movable contact back and forth between the fixed contacts as said device is shifted back and forth by the motor, and means controlled in accordance with a condition which it is desired shall control said motor and which varies the position of said variably-positioned means.

8. Apparatus of the class described comprising a reversible motor, a reversing switch having a solenoid arranged to actuate them and with the reversing switch connected to control the direction of operation of the motor, and means for controlling the solenoid comprising a device shifted in opposite directions by oppositely-directed operation of the motor, a pair of fixed contacts and a movable contact between them all mounted on said device and so connected that engagement of the movable contact with one of the fixed contacts causes operation of the solenoid to close the reversing switch in one direction while engagement of the movable contact with the other fixed contact causes operation of the solenoid to close the reversing switch in the opposite direction, variably-positioned means for moving the movable contact back and forth between the fixed contacts as said device is shifted back and forth by the motor, and means controlled in accordance with a condition which it is desired shall control said motor and which varies the position of said variably-positioned means.

9. In apparatus of the class described having a reversible motor, control means for the motor comprising a control device having relatively movable parts, means operated by the motor to oscillate one of said parts thereby periodically to reverse the motor, and means for changing the setting of the other part thereby to change the time of reversal of the motor, said one part including a pivotally mounted device carrying a pair of contacts and said other part including an arm pivotally mounted on said device and carrying a contact adapted alternately to engage said first named contacts.

OTTO T. HANDWERK.